US012767798B2

(12) United States Patent
Nilsson et al.

(10) Patent No.: US 12,767,798 B2
(45) Date of Patent: Oct. 20, 2026

(54) CABLE

(71) Applicant: BOREALIS AG, Vienna (AT)

(72) Inventors: Susanne Nilsson, Stenungsund (SE); Joy Jie Cheng, Linz (AT); Floran Régis Prades, Linz (AT); Antonios Gitsas, Linz (AT)

(73) Assignee: BOREALIS AG, Vienna (AT)

( * ) Notice: Subject to any disclaimer, the term of this patent is extended or adjusted under 35 U.S.C. 154(b) by 159 days.

(21) Appl. No.: 18/698,528

(22) PCT Filed: Oct. 5, 2022

(86) PCT No.: PCT/EP2022/077711

§ 371 (c)(1), (2) Date: Apr. 4, 2024

(87) PCT Pub. No.: WO2023/057519

PCT Pub. Date: Apr. 13, 2023

(65) Prior Publication Data

US 2024/0425687 A1 Dec. 26, 2024

(30) Foreign Application Priority Data

Oct. 5, 2021 (EP) .................................... 21201000

(51) Int. Cl.

*C08L 23/0807* (2025.01)
*C08K 3/013* (2018.01)

(Continued)

(52) U.S. Cl.

CPC .......... *C08L 23/0815* (2013.01); *C08K 3/013* (2018.01); *C08K 5/34922* (2013.01);

(Continued)

(58) Field of Classification Search

None

See application file for complete search history.

(56) References Cited

U.S. PATENT DOCUMENTS

| | | | | |
|---|---|---|---|---|
| 5,511,104 A | | 4/1996 | Mueller et al. | |
| 6,255,399 B1 * | | 7/2001 | Castellani ........... | C08L 23/0815 525/240 |

(Continued)

FOREIGN PATENT DOCUMENTS

| | | |
|---|---|---|
| CN | 106543563 A | 3/2017 |
| EP | 2450910 A1 | 5/2012 |

(Continued)

OTHER PUBLICATIONS

International Search Report and Written Opinion in Application No. PCT/EP2022/077711, mailed Feb. 10, 2023, 10 pages.

(Continued)

*Primary Examiner* — Arti Singh-Pandey

(74) *Attorney, Agent, or Firm* — Meunier Carlin & Curfman LLC

(57) ABSTRACT

The invention provides a cable, preferably a power cable, comprising one or more conductors surrounded by at least one layer, preferably an insulation layer, wherein said layer comprises a polymer composition comprising: (i) at least 75 wt % of an ethylene based plastomer; and (ii) 0.2 to 10 wt % of an amine filler, oxide filler or mixture thereof; and wherein said polymer composition has a dielectric loss expressed as tan δ (50 Hz) of $200 \times 10^{-4}$ or less, when measured at 500 V/mm and 90° C. as described in the description part under "Determination methods".

20 Claims, 2 Drawing Sheets

Figure 1:
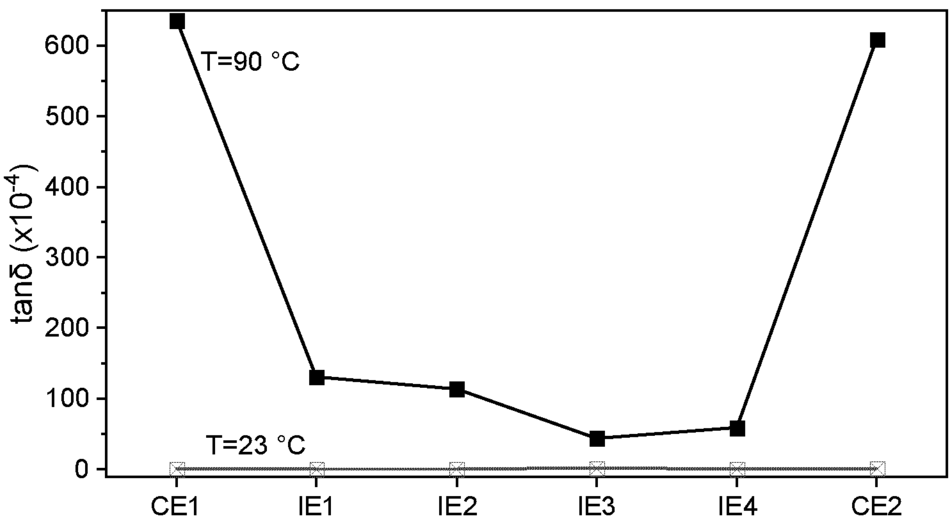

(51) Int. Cl.

| | |
|---|---|
| ***C08K 5/3492*** | (2006.01) |
| ***C08L 23/06*** | (2006.01) |
| ***C08L 23/12*** | (2006.01) |
| ***C08L 23/14*** | (2006.01) |
| ***H01B 3/44*** | (2006.01) |

(52) U.S. Cl.

CPC ............... *C08L 23/06* (2013.01); *C08L 23/12* (2013.01); *C08L 23/14* (2013.01); *H01B 3/441* (2013.01); *C08K 2201/006* (2013.01); *C08K 2201/011* (2013.01); *C08L 2203/206* (2013.01); *C08L 2207/066* (2013.01); *C08L 2312/00* (2013.01)

(56) References Cited

U.S. PATENT DOCUMENTS

| | | | | |
|---|---|---|---|---|
| 6,825,253 | B2 | 11/2004 | Easter | |
| 7,144,934 | B2 | 12/2006 | Ortiz et al. | |
| 2018/0158571 | A1 * | 6/2018 | Setogawa .............. | H01B 3/441 |

FOREIGN PATENT DOCUMENTS

| | | | |
|---|---|---|---|
| EP | 2626911 | B1 | 12/2015 |
| EP | 3173443 | A1 | 5/2017 |
| EP | 2965908 | B1 | 3/2018 |
| WO | 9308222 | A1 | 4/1993 |
| WO | 2004037909 | A2 | 5/2004 |
| WO | 2007/050688 | A2 | 5/2007 |
| WO | 2009/058560 | A1 | 5/2009 |
| WO | 2011079457 | A1 | 7/2011 |
| WO | 2012079243 | A1 | 6/2012 |
| WO | 2015200847 | A1 | 12/2015 |

OTHER PUBLICATIONS

T. J. Person; R. F. Eaton, Reduction of dissipation factor in power cable material systems containing metallocene- and postmetallocene-catalyzed polymers, CEIDP 2009.

* cited by examiner

CABLE

This invention relates to a cable surrounded by at least one layer comprising a polymer composition, wherein the polymer composition comprises an ethylene based plastomer. In particular, the invention relates to such compositions wherein the plastomer is blended with an oxide filler, amine filler, or mixtures thereof, or the plastomer is blended with a polyolefin selected from the group consisting of an LDPE, a polypropylene homopolymer, a random heterophasic polypropylene copolymer and mixtures thereof, or alternatively the plastomer is blended with an oxide filler, amine filler, or mixtures thereof and a polyolefin selected from the group consisting of an LDPE, a polypropylene homopolymer, a random heterophasic polypropylene copolymer and mixtures thereof.

BACKGROUND

Polymers used in wire and cable applications must meet high mechanical and/or electrical requirements. For instance, in power cable applications, particularly in medium voltage (MV) and especially in high voltage (HV) and extra high voltage (EHV) cable applications, the electrical properties of the polymer composition used in the cable have significant importance. Furthermore, the electrical properties of importance may differ in different cable applications, as is the case between alternating current (AC) and direct current (DC) cable applications.

Elastomers and plastomers offer a new range of softness and flexibility, which can be used in many applications, including wire and cable applications. These properties are considered to be a result of the well-distributed α-olefin comonomers within the material, which are generally produced using single site catalysts. However, it has been demonstrated that the dielectric properties of these materials at high temperature are not as good as at room temperature, as a result of non-decomposed catalyst residues. Previous work aimed at improving the commercial potential of plastomers and elastomers in wire and cable applications has thus focused on minimising catalyst residues from high activity catalysts by a careful choice of the metallocene activator (and accepting a higher catalyst cost) or controlling the mobility of the catalyst residues by choosing a proper co-catalyst or trapping agent. This is discussed in, for example, U.S. Pat. No. 5,511,104 and EP 2626911.

Alternative strategies to improve dielectric performance, without altering the catalyst, have included adding charge dissipation modifiers (U.S. Pat. No. 7,144,934), organoclays (WO 2009/058560), clays and hindered amine light stabilizers (WO 2007/050688 and U.S. Pat. No. 6,825,253).

The present inventors have now found that combining an ethylene based plastomer with a particular type of filler can provide a composition with improved dielectric losses at elevated temperatures. Such improvements are also seen when an ethylene based plastomer is combined with an LDPE, propylene homopolymer, random heterophasic polypropylene copolymer or mixtures thereof, optionally further comprising the filler. Surprisingly, all compositions possess a good balance between dielectric, thermal, and mechanical properties (in terms of, for example, flexural modulus and tensile strength).

SUMMARY OF INVENTION

Viewed from one aspect the invention provides a cable, such as a power cable, comprising one or more conductors surrounded by at least one layer, preferably an insulation layer, wherein said layer comprises a polymer composition comprising:

(i) at least 75 wt % of an ethylene based plastomer; and (ii) 0.2 to 10 wt % of an amine filler, oxide filler or mixtures thereof, and wherein said polymer composition has a dielectric loss expressed as tan δ (50 Hz) of $200\times10^{-4}$ or less, when measured at 500V/mm and 90° C. as described in the description part under "Determination methods".

Viewed from a second aspect the invention provides a cable, such as a power cable, comprising one or more conductors surrounded by at least one layer, preferably an insulation layer, wherein said layer comprises a polymer composition comprising:

(i) 5 to 50 wt % of an ethylene based plastomer; and (ii) 50 to 95 wt % of a polyolefin (a) selected from the group consisting of an LDPE, polypropylene homopolymer, random heterophasic polypropylene copolymer and mixtures thereof:

and wherein said polymer composition has a dielectric loss expressed as tan δ (50 Hz) of $200\times10^{-4}$ or less, when measured at 500 V/mm and 90° C. as described in the description part under "Determination methods".

Viewed from a third aspect the invention provides a cable, such as a power cable, comprising one or more conductors surrounded by at least one layer, wherein said layer comprises a polymer composition comprising:

(i) 5 to 50 wt % of an ethylene based plastomer;

(ii) 50 to 95 wt % of a polyolefin (a) selected from the group consisting of an LDPE, polypropylene homopolymer, random heterophasic polypropylene copolymer and mixtures thereof; and (iii) 0.2 to 10 wt % of an amine filler, oxide filler, or mixtures thereof;

and wherein said polymer composition has a dielectric loss expressed as tan δ (50 Hz) of $50\times10^{-4}$ or less, when measured at 500 V/mm and 90° C. as described in the description part under "Determination methods".

Viewed from a further aspect the invention provides a process for producing a cable as hereinbefore defined comprising the steps of: applying on one or more conductors, a layer comprising a polymer composition as hereinbefore defined.

Definitions

Wherever the term "molecular weight Mw" is used herein, the weight average molecular weight is meant.

Throughout the present application, the average particle size of a fraction is the particle size at which 50 wt % of all particles are smaller than the indicated particle size.

The term "ethylene based plastomer", as used herein, refers to a plastomer which comprises a majority amount of polymerized ethylene monomer (based on the weight of the plastomer) and, optionally, may contain at least one comonomer.

The term "polyethylene" will be understood to mean an ethylene based polymer, i.e. one comprising at least 50 wt % ethylene, based on the total weight of the polymer as a whole.

The term "polypropylene" will be understood to mean a propylene based polymer, i.e. one comprising at least 50 wt % propylene, based on the total weight of the polymer as a whole.

The polymer composition of the invention may also be referred to as a polymer blend herein. These terms are used interchangeably.

The low density polyethylene, LDPE, employed in the invention is a polyethylene produced in a high pressure process. Typically the polymerization of ethylene and optional further comonomer(s) in a high pressure process is carried out in the presence of an initiator(s). The meaning of the term LDPE is well known and documented in the literature. The term LDPE describes and distinguishes a high pressure polyethylene from polyethylenes produced in the presence of an olefin polymerization catalyst. LDPEs have certain typical features, such as different branching architecture. A typical density range for an LDPE is 0.910 to 0.940 g/cm$^3$.

The term "tan δ" or "tan delta", as used herein, means tangent delta which is a well known measure of dielectric loss. As mentioned the method for determining tan delta is described below under "Determination methods".

The term "conductor" means herein a conductor comprising one or more wires. The wire can be for any use and be e.g. optical, telecommunication or electrical wire. Moreover, the cable may comprise one or more such conductors. Preferably the conductor is an electrical conductor and comprises one or more metal wires.

DETAILED DESCRIPTION OF INVENTION

The present invention teaches a cable comprising at least one layer comprising a polymer composition comprising an ethylene based plastomer together with a particular class of filler(s), or one or more polyolefins (a) selected from a low density polyethylene (LDPE), a polypropylene homopolymer (PP) and a random heterophasic polypropylene copolymer (RAHECO), or a mixture of the filler(s) with the one or more polyolefins (a). Unexpectedly, these polymer compositions of the invention have advantageous dielectric properties, e.g. in terms of reduced tan delta, which is balanced with good mechanical properties.

Ethylene Based Plastomer

It will be understood that by "ethylene-based" plastomer, we mean a plastomer in which the majority by weight derives from ethylene monomer units. Suitable ethylene-based plastomers may have an ethylene content from 60 to 95 wt %, preferably from 62 to 90 wt % and more preferably from 65 to 85 wt %. The comonomer contribution preferably is up to 40 wt %, more preferably up to 35 wt %. The comonomer contents of conventional ethylene plastomers are familiar to the person skilled in the art.

The ethylene based plastomer is preferably a copolymer of ethylene and propylene or a C4-C10 alpha-olefin. Suitable C4-C10 alpha-olefins include 1-butene, 1-hexene and 1-octene, preferably 1-butene or 1-octene and more preferably 1-octene. Ideally there is only one comonomer present. Preferably copolymers of ethylene and 1-octene are used.

The density of the ethylene-based plastomer is preferably in the range of 0.850 to 0.915 g/cm$^3$, more preferably in the range of 0.855 to 0.910 g/cm$^3$, such as 0.858 to 0.903 g/cm$^3$.

The $MFR_2$ (ISO 1133; 190° C.; 2.16 kg) of suitable ethylene based plastomers is preferably in the range of 0.5-30 g/10 min, more preferably in the range of 1.0-15 g/10 min and even more preferably in the range of 1.0-10.0 g/min.

The melting points (measured with DSC according to ISO 11357-3:1999) of suitable ethylene based plastomers can be below 130° C., preferably below 120° C., more preferably below 110° C. and most preferably below 100° C. A reasonable lower limit for the melting points of suitable ethylene based plastomers may be 30° C. A typical melting point range is 33 to 115° C. Furthermore suitable ethylene based plastomers may have a glass transition temperature Tg (measured with DMTA according to ISO 6721-7) of below −40° C., preferably below −45° C., more preferably below −50° C.

The Mw/Mn value of the ethylene based plastomer, representing the broadness of the molecular weight distribution (MWD), is preferably in the range of 1.5 to 5.0, more preferably in the range of 2.0 to 4.5, even more preferably in the range of 2.5 to 4.0.

The ethylene based plastomer can be unimodal or multimodal, preferably unimodal.

Preferably, the PE plastomer is a metallocene catalysed polymer although Ziegler-Natta based polyethylene plastomers are also possible.

Whilst it is within the ambit of the invention for a single ethylene based plastomer to be used, it is also possible for a mixture of two or more ethylene based plastomers as defined herein to be employed. Preferably, a single ethylene based plastomer is used.

Suitable ethylene based plastomers can be any copolymer of ethylene and propylene or ethylene and C4-C10 alpha olefin having the above defined properties, which are commercial available, i.a. from Borealis AG (AT) under the tradename Queo, from DOW Chemical Corp (USA) under the tradename Engage or Affinity, or from Mitsui under the tradename Tafmer.

Alternatively, the ethylene based plastomer can be prepared by known processes, in a one stage or two stage polymerization process, comprising solution polymerization, slurry polymerization, gas phase polymerization or combinations therefrom, in the presence of suitable catalysts, like vanadium oxide catalysts or single-site catalysts, e.g. metallocene or constrained geometry catalysts, known to the art skilled persons.

Preferably these ethylene based plastomers are prepared by a one stage or two stage solution polymerization process, especially by high temperature solution polymerization process at temperatures higher than 100° C.

Such processes are essentially based on polymerizing the monomer and a suitable comonomer in a liquid hydrocarbon solvent in which the resulting polymer is soluble. The polymerization is carried out at a temperature above the melting point of the polymer, as a result of which a polymer solution is obtained. This solution is flashed in order to separate the polymer from the unreacted monomer and the solvent. The solvent is then recovered and recycled in the process.

Preferably the solution polymerization process is a high temperature solution polymerization process, using a polymerization temperature of higher than 100° C. Preferably the polymerization temperature is at least 110° C., more preferably at least 150° C. The polymerization temperature can be up to 250° C.

The pressure in such a solution polymerization process is preferably in a range of 10 to 100 bar, preferably 15 to 100 bar and more preferably 20 to 100 bar.

The liquid hydrocarbon solvent used is preferably a C5-12-hydrocarbon which may be unsubstituted or substituted by a C1-4 alkyl group such as pentane, methyl pentane, hexane, heptane, octane, cyclohexane, methyl cyclohexane and hydrogenated naphtha. More preferably unsubstituted C6-10 hydrocarbon solvents are used.

A known solution technology suitable for the process according to the invention is the Borceed technology.

It will be appreciated that the ethylene based plastomer may contain standard polymer additives, such as antioxidant(s) and scorch retardant(s).

Polyolefin (a)

In some embodiments of the invention, the ethylene based plastomer is combined with a polyolefin (a) selected from the group consisting of an LDPE, polypropylene homopolymer, random heterophasic polypropylene copolymer and mixtures thereof. This polyolefin (a) is present in an amount of 50 to 95 wt %, relative to the total weight of the polymer composition, preferably 60 to 90 wt %, such as 70 to 85 wt %. Whilst it is within the ambit of the invention for polyolefin (a) to comprise a mixture of polymers as defined above, it is preferable if only a single polymer is present.

LDPE

The low density polyethylene (LDPE) used in the composition of the invention may have a density of 915 to 940 $kg/m^3$, preferably 918 to 935 $kg/m^3$, especially 920 to 932 $kg/m^3$, such as about 920 to 930 $kg/m^3$.

The $MFR_2$ (2.16 kg, 190° C.) of the LDPE polymer is preferably from 0.05 to 30.0 g/10 min, more preferably is from 0.1 to 20 g/10 min, and most preferably is from 0.1 to 10 g/10 min, especially 0.1 to 5.0 g/10 min. In a preferred embodiment, the $MFR_2$ of the LDPE is 0.1 to 4.0 g/10 min, especially 0.5 to 4.0 g/10 min, especially 1.0 to 3.0 g/10 mm.

The LDPE may have an Mw of 80 kg/mol to 200 kg/mol, such as 100 to 180 kg/mol.

The LDPE may have a PDI of 5 to 15, such as 8 to 14.

It is possible to use a mixture of LDPEs in the polymer composition of the invention however it is preferred if a single LDPE is used.

The low density polyethylene (LDPE) is an ethylene-based polymer. The term, "ethylene-based polymer," as used herein, is a polymer that comprises a majority weight percent polymerized ethylene monomer (based on the total weight of polymerizable monomers), and optionally may comprise at least one polymerized comonomer. The ethylene-based polymer may include greater than 50, or greater than 60, or greater than 70, or greater than 80, or greater than 90 weight percent units derived from ethylene (based on the total weight of the ethylene-based polymer).

The LDPE may be a low density homopolymer of ethylene (referred herein as LDPE homopolymer) or a low density copolymer of ethylene with one or more comonomer(s) (referred herein as LDPE copolymer).

In embodiments wherein the LDPE does comprise comonomer(s), then these may be polar comonomer(s), non-polar comonomer(s) or a mixture of the polar comonomer(s) and non-polar comonomer(s). Moreover, the LDPE may optionally be unsaturated. In one embodiment, where the LDPE is an LDPE copolymer, it is preferably an LDPE terpolymer (i.e. a copolymer of ethylene and two comonomers).

As a polar comonomer for the LDPE copolymer, comonomer(s) containing hydroxyl group(s), alkoxy group(s), carbonyl group(s), carboxyl group(s), ether group(s) or ester group(s), or a mixture thereof, can be used. More preferably, comonomer(s) containing carboxyl and/or ester group(s) are used as said polar comonomer. Still more preferably, the polar comonomer(s) of the LDPE copolymer is selected from the groups of acrylate(s), methacrylate(s) or acetate(s), or any mixtures thereof.

If present in said LDPE copolymer, the polar comonomer(s) is preferably selected from the group of alkyl acrylates, alkyl methacrylates or vinyl acetate, or a mixture thereof. Further preferably, said polar comonomers are selected from C1- to C6-alkyl acrylates, C1- to C6-alkyl methacrylates or vinyl acetate. Still more preferably, said LDPE copolymer is a copolymer of ethylene with C1- to C4-alkyl acrylate, such as methyl, ethyl, propyl or butyl acrylate, or vinyl acetate, or any mixture thereof.

Preferably, the polar group containing monomer units are selected from acrylates or acetate comonomer units, preferably from alkyl (meth)acrylate or vinyl acetate comonomer units, preferably alkyl (meth)acrylate comonomer units.

In the present invention the term "alkyl (meth)acrylate comonomer units" encompasses alkyl acrylate comonomer units and/or alkyl methacrylate comonomer units. The alkyl moiety in the alkyl(meth)acrylate comonomer units is preferably selected from C1 to C4-hydrocarbyls, whereby the C3 or C4 hydrocarbyl may be branched or linear.

As the non-polar comonomer(s) for the LDPE copolymer, comonomer(s) other than the above defined polar comonomers can be used. Preferably, the non-polar comonomers are other than comonomer(s) containing hydroxyl group(s), alkoxy group(s), carbonyl group(s), carboxyl group(s), ether group(s) or ester group(s). One group of preferable non-polar comonomer(s) comprise, preferably consist of, monounsaturated (=one double bond) comonomer(s), preferably olefins, preferably alpha-olefins, more preferably C3 to C10 alpha-olefins, such as propylene, 1-butene, 1-hexene, 4-methyl-1-pentene, styrene, 1-octene, 1-nonene; polyunsaturated (=more than one double bond) comonomer(s); a silane group containing comonomer(s); or any mixtures thereof. The polyunsaturated comonomer(s) are further described below in relation to unsaturated LDPE copolymers.

If the LDPE polymer is a copolymer, it preferably comprises 0.001 to 35 wt. %, still more preferably less than 30 wt. %, more preferably less than 25 wt %, of one or more comonomer(s). Preferred ranges include 0.5 to 10 wt %, such as 0.5 to 5 wt % comonomer.

The LDPE polymer, may optionally be unsaturated, i.e. may comprise carbon-carbon double bonds (—C=C—). Preferred "unsaturated" LDPEs contains carbon-carbon double bonds/1000 carbon atoms in a total amount of at least 0.4/1000 carbon atoms. If a non-cross-linked LDPE is used in the final cable, then the LDPE is typically not unsaturated as defined above. By not unsaturated is meant that the C=C content is preferably less than 0.2/1000 carbon atoms, such as 0.1/1000 C atoms or less.

As well known, the unsaturation can be provided to the LDPE polymer by means of the comonomers, a low molecular weight (Mw) additive compound, such as a CTA, cross-linking booster or scorch retarder additive, or any combinations thereof. The total amount of double bonds means herein double bonds added by any means. If two or more above sources of double bonds are chosen to be used for providing the unsaturation, then the total amount of double bonds in the LDPE polymer means the sum of the double bonds present. Any double bond measurements are carried out prior to optional crosslinking.

The term "total amount of carbon-carbon double bonds" refers to the combined amount of double bonds which originate from vinyl groups, vinylidene groups and trans-vinylene groups, if present.

If an LDPE homopolymer is unsaturated, then the unsaturation can be provided e.g. by a chain transfer agent (CTA), such as propylene, and/or by polymerization conditions. If an LDPE copolymer is unsaturated, then the unsaturation can be provided by one or more of the following means: by a chain transfer agent (CTA), by one or more polyunsaturated comonomer(s) or by polymerization conditions. It is well known that selected polymerization conditions such as peak temperatures and pressure, can have an influence on the unsaturation level. In case of an unsaturated LDPE copolymer, it is preferably an unsaturated LDPE copolymer of ethylene with at least one polyunsaturated comonomer, and optionally with other comonomer(s), such as polar comonomer(s) which is preferably selected from acrylate or acetate comonomer(s). More preferably an unsaturated LDPE copolymer is an unsaturated LDPE copolymer of ethylene with at least polyunsaturated comonomer(s).

The polyunsaturated comonomers suitable as the non polar comonomer preferably consist of a straight carbon chain with at least 8 carbon atoms and at least 4 carbons between the non-conjugated double bonds, of which at least one is terminal, more preferably, said polyunsaturated comonomer is a diene, preferably a diene which comprises at least eight carbon atoms, the first carbon-carbon double bond being terminal and the second carbon-carbon double bond being non-conjugated to the first one. Preferred dienes are selected from C8 to C14 non-conjugated dienes or mixtures thereof, more preferably selected from 1,7-octadiene, 1,9-decadiene, 1,11-dodecadiene, 1,13-tetradecadiene, 7-methyl-1,6-octadiene, 9-methyl-1,8-decadiene, or mixtures thereof. Even more preferably, the diene is selected from 1,7-octadiene, 1,9-decadiene, 1,11-dodecadiene, 1,13-tetradecadiene, or any mixture thereof, however, without limiting to above dienes.

It is well known that e.g. propylene can be used as a comonomer or as a chain transfer agent (CTA), or both, whereby it can contribute to the total amount of the carbon-carbon double bonds, preferably to the total amount of the vinyl groups. Herein, when a compound which can also act as comonomer, such as propylene, is used as CTA for providing double bonds, then said copolymerizable comonomer is not calculated to the comonomer content.

If the LDPE polymer is unsaturated, then it has preferably a total amount of carbon-carbon double bonds, which originate from vinyl groups, vinylidene groups and trans-vinylene groups, if present, of more than 0.4/1000 carbon atoms, preferably of more than 0.5/1000 carbon atoms. The upper limit of the amount of carbon-carbon double bonds present in the polyolefin is not limited and may preferably be less than 5.0/1000 carbon atoms, preferably less than 3.0/1000 carbon atoms.

If the LDPE is an unsaturated LDPE as defined above, it contains preferably at least vinyl groups and the total amount of vinyl groups is preferably higher than 0.05/1000 carbon atoms, still more preferably higher than 0.08/1000 carbon atoms, and most preferably of higher than 0.11/1000 carbon atoms. Preferably, the total amount of vinyl groups is of lower than 4.0/1000 carbon atoms. More preferably, the second polyolefin (b) contains vinyl groups in total amount of more than 0.20/1000 carbon atoms, still more preferably of more than 0.30/1000 carbon atoms.

The LDPE is preferably an LDPE copolymer, most preferably an unsaturated LDPE copolymer comprising ethylene and at least one polyunsaturated comonomer(s), wherein the at least one polyunsaturated comonomer(s) is preferably selected from C8 to C14 non-conjugated dienes or mixtures thereof, more preferably selected from 1,7-octadiene. Thus, a particularly preferable LDPE polymer is an LDPE copolymer comprising ethylene and 1,7-octadiene.

In one embodiment, the LDPE is an LDPE terpolymer. A particularly preferred LDPE terpolymer is a terpolymer of ethylene, butyl acrylate and 1,7-octadiene.

The LDPE polymer may have a high melting point, which may be of importance especially for a thermoplastic insulation material. Melting points of 110° C. or more are envisaged, preferably 112° C. or more, such as 114° C. or more, especially 116° C. or more, such as 112 to 125° C.

The LDPE polymer is produced at high pressure by free radical initiated polymerization (referred to as high pressure (HP) radical polymerization). The HP reactor can be e.g. a well-known tubular or autoclave reactor or a mixture thereof, preferably a tubular reactor. The high pressure (HP) polymerization and the adjustment of process conditions for further tailoring the other properties of the polyolefin depending on the desired end application are well known and described in the literature, and can readily be used by a skilled person.

In a tubular reactor the polymerization is effected at temperatures which typically range up to 400° C., preferably from 80 to 350° C. and pressure from 70 MPa, preferably 100 to 400 MPa, more preferably from 100 to 350 MPa. Pressure can be measured at least after compression stage and/or after the tubular reactor. Temperature can be measured at several points during all steps.

The autoclave process may, for example, be conducted in a stirred autoclave reactor. The stirred autoclave reactor is commonly divided into separate zones. The main flow pattern is from top zone(s) to bottom zone(s), but backmixing is allowed and sometimes desired. The stirrer is preferably designed to produce efficient mixing and flow patterns at a suitable speed of rotation selected by a person skilled in the art. The compressed mixture is commonly cooled and fed to one or more of the reactor zones. Radical initiators may also be injected at one or more zones along the reactor. As radical initiator, any compound or a mixture thereof that decomposes to radicals at an elevated temperature can be used. Usable radical initiators are commercially available.

After the separation the obtained LDPE is typically in a form of a polymer melt which is normally mixed and pelletized in a pelletising section, such as pelletising extruder, arranged in connection to the HP reactor system. Optionally, additive(s), such as antioxidant(s), can be added in this mixer in a known manner.

Further details of the production of ethylene (co)polymers by high pressure radical polymerization can be found i.a. in the Encyclopedia of Polymer Science and Engineering, Vol. 6 (1986), pp 383-410 and Encyclopedia of Materials: Science and Technology, 2001 Elsevier Science Ltd.: "Polyethylene: High-pressure, R. Klimesch, D. Littmann and F.-O. Mähling pp. 7181-7184.

When an unsaturated LDPE copolymer of ethylene is prepared, then, as well known, the carbon-carbon double bond content can be adjusted by polymerizing the ethylene e.g. in the presence of one or more polyunsaturated comonomer(s), chain transfer agent(s), or both, using the desired feed ratio between monomer, preferably ethylene, and polyunsaturated comonomer and/or chain transfer agent, depending on the nature and amount of C—C double bonds desired for the unsaturated LDPE copolymer. I.a. WO 9308222 describes a high pressure radical polymerization of ethylene with polyunsaturated monomers. As a result the unsaturation can be uniformly distributed along the polymer chain in random copolymerization manner.

Propylene Homopolymer

The propylene homopolymer is preferably an isotactic polypropylene homopolymer.

A polypropylene homopolymer suitable for use in the blend of the invention may have a density of from 0.895 to 0.920 g/cm$^3$, preferably from 0.900 to 0.915 g/cm$^3$, and more preferably from 0.905 to 0.915 g/cm$^3$ as determined in accordance with ISO 1183.

It may have a melt flow rate (MFR) of from 0.1 to 100 g/10 min, preferably from 0.5 to 50 g/10 min as determined in accordance with ISO 1133 (at 230° C.; 2.16 kg load). Most preferably, the MFR is in the range of 1.0 to 5.0 g/l 0 min, such as 1.5 to 4.0 g/10 min.

Usually the melting temperature of the PP homopolymer component is within the range of 135 to 170° C., preferably in the range of 140 to 168° C., more preferably in the range from 142 to 166° C. as determined by differential scanning calorimetry (DSC) according to ISO 11357-3. In one embodiment the melting temperature of the PP homopolymer component is at least 150° C.

The propylene homopolymer may have an Mw in the range of 200 kg/mol to 600 kg/mol.

These polymers are readily available from polymer suppliers.

Random Heterophasic Polypropylene Copolymer

The random heterophasic polypropylene copolymer contains a propylene homopolymer or copolymer matrix phase component (A), and a propylene copolymer rubber component (B) dispersed within the matrix phase.

It is preferred if the random heterophasic polypropylene copolymer has an MFR (2.16 kg, 230° C.) of 0.1 to 50 g/10 min, determined according to ISO 1133, preferably 0.1 to 25 g/10 min, more preferably 0.5 to 10.0 g/10 min.

The random heterophasic polypropylene copolymer according to the invention preferably has a melting temperature (Tm) of 130 to 155° C., more preferably of 135 to 150° C., determined according to ISO 11357-1, -2 and -3.

Furthermore, the random heterophasic polypropylene copolymer according to the invention preferably has a crystallisation temperature (Tc) of 90 to 120° C., more preferably of 95 to 115° C., and most preferably of 98 to 112° C., determined according to ISO 11357-1, -2 and -3.

Propylene matrix component (A) may consist of a single propylene homopolymer or random copolymer, but matrix component (A) may also comprise a mixture of different propylene homo- or copolymers. In a preferred embodiment matrix component (A) consists of a single propylene homopolymer or single random propylene copolymer. In a preferred embodiment matrix component (A) consists of a single propylene random copolymer.

The propylene copolymer rubber component (B) may consist of a single polymer, but may also comprise a mixture of different polymers.

Matrix component (A) preferably has a comonomer content of 0 to 4.5 wt %, more preferably of 0.5 to 3.5 wt %, and most preferably of 0.9 to 2.5 wt %.

Comonomer units present in matrix component (A) are preferably selected from a group consisting of alpha-olefins having 2 and/or from 4 to 12 carbon atoms. It is especially preferred that the comonomer units in matrix phase (A) are ethylene comonomer units.

It is preferred if the matrix component (A) forms 10 to 50 wt %, preferably 15 to 45 wt % or 25 to 50 wt % of the random heterophasic polypropylene copolymer.

It is thus also preferred that the fraction insoluble in p-xylene at 25° C. (XCU) in the random heterophasic polypropylene copolymer is 10 to 50 wt %, preferably 15 to 45 wt % or 25 to 50 wt % of the random heterophasic polypropylene copolymer.

The XCU phase preferably has an amount of comonomer units of 0 to 4.5 wt %, more preferably of 0.5 to 3.5 wt %, and most preferably of 0.9 to 2.5 wt %.

Furthermore, the XCU phase preferably has a weight average molecular weight (Mw) of 100 to 650 kg/mol, more preferably of 150 to 550 kg/mol, and most preferably of 200 to 500 kg/mol, measured by GPC according to ISO 16014-1 and -4.

In addition, the XCU phase preferably has an intrinsic viscosity of 0.5 to 3.5 dl/g, more preferably of 1.0 to 3.0 dl/g and most preferably of 1.1 to 2.8 dl/g, determined according to DIN EN ISO 1628-1 and -3.

In the random heterophasic polypropylene copolymer, component B) is preferably present in an amount of at least 50 wt % of the random heterophasic polypropylene copolymer, such as 50 to 90 wt %, preferably 55 to 85 wt % or 50 to 75 wt % of the random heterophasic polypropylene copolymer.

The fraction soluble in p-xylene at 25° C. (XCS) is thus preferably present in the random heterophasic polypropylene copolymer in an amount of 50 to 90 wt %, preferably 55 to 85 wt % or 50 to 75 wt %.

The XCS phase preferably has an amount of ethylene comonomer units of 20 to 60 wt %, more preferably of 20 to 50 wt %.

The fraction soluble in p-xylene at 25° C. (XCS) has a molecular weight distribution (Mw/Mn) of 1.0 to 4.0, preferably of 2.0 to 3.7 and more preferably of 2.8 to 3.5.

Comonomer units present in rubber component (B) are preferably selected from a group consisting of alpha-olefins having 2 and/or from 4 to 12 carbon atoms. It is especially preferred that the comonomer units in phase (B) are ethylene comonomer units. Component (B) is a random copolymer.

Furthermore, the XCS phase preferably has a weight average molecular weight (Mw) of 100 to 350 kg/mol, more preferably of 150 to 300 kg/mol, and most preferably of 180 to 250 kg/mol, measured by GPC according to ISO 16014-1 and -4.

In addition, the XCS phase preferably has an intrinsic viscosity of 1.0 to 3.0 dl/g, more preferably of 1.2 to 2.4 dl/g and most preferably of 1.3 to 1.9 dl/g, determined according to DIN EN ISO 1628-1 and -3.

Random heterophasic polypropylene copolymers are well known and can be purchased from polymer suppliers such as Borealis.

Preferably random heterophasic polypropylene copolymers of the invention are produced in a multi-stage process. Preferably these copolymers are prepared by known processes in multistage, solution polymerization, slurry polymerization, gas phase polymerization processes, in the presence of highly stereospecific Ziegler-Natta catalysts, suitable vanadium oxide catalysts or single-site catalysts like metallocene or constrained geometry catalysts, known to the art skilled persons.

In a preferred embodiment, the random heterophasic polypropylene copolymer can be prepared by sequential polymerization, comprising at least two reactors wherein first the matrix component A is produced and secondly the rubber copolymer component B is produced in the presence of the matrix component A. A preferred sequential polymerization process comprises at least one loop reactor and at least one subsequent gas phase reactor. Such a process can have up to 3 gas phase reactors.

The matrix polymer component A is produced first, i.e. in the loop reactor, and subsequently transferred to the at least one gas phase reactor, where the polymerization of ethylene, propylene or a C4 to C10 alpha olefin or mixtures therefrom takes place in the presence of the matrix polymer component A. It is possible that the so produced polymer is transferred to a second gas phase reactor.

A further possibility is that the matrix polymer component A is produced in the loop reactor and the first subsequent gas phase reactor. The matrix component A is then transferred to the at least second gas phase reactor where the polymerization of ethylene and propylene or a C4 to C10 alpha olefin or mixtures therefrom takes place in the presence of the matrix polymer component A. It is possible that the so produced polymer is transferred to a third gas phase reactor.

A suitable sequential polymerization process is, e.g. the Borstar® process of Borealis AG.

Filler

In some embodiments of the invention, the ethylene based plastomer is combined with an oxide filler, amine filler or mixture thereof.

The amine filler and/or oxide filler is present in an amount of 0.2 to 10 wt %, relative to the total weight of the polymer composition, preferably 0.5 to 8.0 wt %, more preferably 1.0 to 5.0 wt %. It will be understood that where more than one filler is present in the polymer composition, these wt % ranges refer to the total amount of all fillers present.

The filler preferably has a specific surface area (BET) of 50 to 600 $m^2/g$, more preferably 60 to 400 $m^2/g$, such as 70 to 300 $m^2/g$.

The filler preferably has an average particle size of 5 to 50 nm, more preferably 5 to 30 nm, such as 5 to 20 nm.

The filler preferably has a tamped density of 25 to 100 g/l, more preferably 40 to 80 g/l.

The oxide filler is preferably a metal or metalloid oxide, where said metal or metalloid is preferably aluminium or silicon. Within this class, fumed metal or metalloid oxides are particularly preferable. By "fumed" (also termed "thermal" or "pyrogenic") we mean oxides which have been produced by a flame hydrolysis method. Those skilled in the art will appreciate that such prepared methods will impart characteristic properties on the fumed product, including low bulk density and high surface area. The oxide filler is preferably amorphous.

As silicon oxides (also termed "silicas"), hydrophobic fumed silicas are particularly preferred, such as AEROSIL silicas, e.g. AEROSIL R-805 and AEROSIL R-812. Such silicas are known to the skilled person to be fumed silicas which are after treated with a silane, such as a halogen silane, alkoxysilane, silazane or siloxane. Hydrophobic fumed silicas thus comprise at least one silicon-carbon bond resulting from this after treatment.

As aluminium oxides, hydrophobic fumed aluminium oxides are particularly preferred, such as AEROXIDE aluminium oxides, e.g. AEROXIDE Alu C 805. Such aluminium oxides are known to the skilled person to be fumed aluminium oxides which are after treated with a silane, such as a halogen silane, alkoxysilane, silazane or siloxane. Hydrophobic fumed aluminium oxides thus comprise at least one aluminium-carbon bond resulting from this after treatment.

The amine filler is preferably a derivative of cyanamide, such as the trimer of cyanamide, melamine (2,4,6-triamino-1,3,5-triazine, with empirical formula $C_3H_6N_6$), or calcium cyanamide ($CaCN_2$). Melamine is typically added in the form of white, crystalline powder, with a typical purity of min 99.8%. Density of melamine is usually 1.574 $kg/m^3$, with a melting point of 354° C., basic pH in aqueous suspension (7.5-9.5, 10% melamine in water) and D40<32 µm.

Polymer Composition

As discussed above, the polymer compositions used in the cables of the invention comprise an ethylene based plastomer combined with a particular class of filler and/or a polyolefin (a).

When combined with the filler alone, as hereinbefore defined, the ethylene based plastomer is present in an amount of at least 75 wt %, relative to the total weight of the composition, such as at least 80 wt %. Preferably, in this embodiment, the plastomer is present in the range 75 to 99.8 wt %, more preferably 80 to 99.8 wt %, even more preferably 90 to 99.8 wt %, such as 92 to 99.5 wt %, e.g. 95 to 99 wt %, wherein said wt % values are relative to the total weight of the composition as a whole.

In this embodiment, the polymer composition preferably consists of the ethylene based plastomer as the sole polymer component. The term "consists of" implies that there are no other polymer components present in the composition. It will be appreciated that the polymer composition may contain standard polymer additives discussed in more detail below. The term consists essentially of is used to exclude the presence of other polymer components but is intended to allow the option of additives being present. Such additives may be carried on a polymer support.

When combined with the polyolefin (a) as hereinbefore defined, alone or in combination with the filler, the ethylene based plastomer is present in an amount of 5 to 50 wt %, relative to the total weight of the composition. Preferably, in this embodiment, the plastomer is present in the range 10 to 40 wt %, more preferably 15 to 30 wt %, wherein said wt % values are relative to the total weight of the composition as a whole.

In this embodiment, the polymer composition preferably consists of the ethylene based plastomer and the polyolefin (a) as the sole polymer components. The term "consists of" implies that there are no other polymer components present in the composition. It will be appreciated that the polymer composition may contain standard polymer additives discussed in more detail below. The term consists essentially of is used to exclude the presence of other polymer components but is intended to allow the option of additives being present. Such additives may be carried on a polymer support.

During manufacture of the composition, the components can be blended and homogenously mixed, e.g. melt mixed in an extruder.

The polymer composition of the cable of the invention may comprise further additive(s), such as antioxidant(s) and scorch retardant(s). The additives depend on the desired properties of the cable, and can be selected by a skilled person. The total amount of further additive(s), if present, is generally from 0.01 to 10 wt %, preferably from 0.05 to 7 wt %, more preferably from 0.2 to 5 wt %, based on the total amount of the polymer composition.

In embodiments of the invention wherein the ethylene based plastomer is combined with the filler or polyolefin (a), the polymer composition has a dielectric loss expressed as tan δ (50 Hz) of $200\times10^{-4}$ or less, when measured at 500V/mm and 90° C. as described in the description part under "Determination methods. Preferable ranges for tan δ (50 Hz) are $180\times10^{-4}$ or less, or $150\times10^{-4}$ or less.

In embodiments of the invention wherein the ethylene based plastomer is combined with the filler and polyolefin (a), the polymer composition has a dielectric loss expressed as tan δ (50 Hz) of $50\times10^{-4}$ or less, when measured at 500V/mm and 90° C. as described in the description part under "Determination methods. Preferable ranges for tan δ (50 Hz) are $40\times10^{-4}$ or less, or $30\times10^{-4}$ or less.

The polymer composition preferably has a Flex modulus of 10-100 MPa for compositions comprising a LDPE and 100-1000 MPa for compositions comprising a random heterophasic polypropylene copolymer, when measured according to ISO 178:2019.

The polymer composition preferably has a Hot set elongation of 30-75% when measured according to EN 60811-507:2012.

The polymer composition preferably has Shore D hardness of 20-40 when measured according to ISO 868 and ISO 7619-1.

In a preferred embodiment, the polymer composition is crosslinked. Ideally, where the polymer composition is crosslinked, it will have been crosslinked in the presence of a crosslinking agent, preferably a peroxide, more preferably an organic peroxide. It will be appreciated that, prior to crosslinking, the composition comprising the crosslinking agent (e.g. peroxide) may be termed "crosslinkable". It will also be appreciate that, once crosslinked, the composition will no longer comprise the crosslinking agent (e.g. peroxide). Methods for crosslinking are well known in the art.

Cables

The polymer compositions described above are used in a cable such as a power cable, e.g. an AC power cable. A power cable is defined to be a cable transferring energy operating at any voltage level, typically operating at voltages higher than 1 kV. The power cable can be a low voltage (LV), a medium voltage (MV), a high voltage (IV) or an extra high voltage (EHV) cable, which terms, as well known, indicate the level of operating voltage. The polymer composition may be used in the insulation layer for a power cable operating at voltages higher than 36 kV, for example a HV AC cable. The polymer composition is preferably used in the insulation layer for a power cable operating at voltages in the range 6 to 36 kV, for example a MV AC cable.

Preferably, the MV AC power cable of the invention is one operating at voltages in the range 6 kV to 36 kV.

Preferably the HV AC power cable of the invention is one operating at voltages of 40 kV or higher, even at voltages of 50 kV or higher. More preferably, the HV AC power cable operates at voltages of 60 kV or higher. EHV AC power cables operate at very high voltage ranges e.g as high as up to 800 kV, however without limiting thereto.

The polymer composition of the invention forms a layer, preferably an insulation layer, on the conductor in the cable. In one embodiment, this layer is crosslinked.

The cable, such as a power cable, of the invention preferably comprises an inner semi-conductive layer comprising a first semiconductive composition, an insulation layer comprising the polymer composition of the invention and an outer semiconductive layer comprising a second semiconductive composition, in that order.

The polymer composition of the invention is preferably used in the insulation layer of the cable. Ideally, the insulation layer comprises at least 95 wt %, such as at least 98 wt % of the polymer composition of the invention, such as at least 99 wt %. It is preferred therefore if the polymer composition of the invention is the only non-additive component used in the insulation layer of the cables of the invention. Thus, it is preferred if the insulation layer consists essentially of the composition of the invention. The term consists essentially of is used herein to mean that the only polymer composition present is that defined. It will be appreciated that the insulation layer may contain standard polymer additives such as scorch retarders, water tree retarders, antioxidants and so on. These are not excluded by the term "consists essentially of". Note also that these additives may be added as part of a masterbatch and hence carried on a polymer carrier. The use of masterbatch additives is not excluded by the term consists essentially of.

The insulation layer may be crosslinked.

The insulation layer may contain, in addition to the polymer composition of the invention further component(s) such as additives (such as any of antioxidant(s), scorch retarder(s) (SR), stabiliser(s), crosslinking boosters and processing aid(s)).

The insulation layer may therefore comprise conventionally used additive(s) for W&C applications, such as one or more antioxidant(s) and optionally one or more scorch retarder(s), preferably at least one or more antioxidant(s). The used amounts of additives are conventional and well known to a skilled person, e.g. 0.1 to 1.0 wt %.

As non-limiting examples of antioxidants e.g. sterically hindered or semi-hindered phenols, aromatic amines, aliphatic sterically hindered amines, organic phosphites or phosphonites, thio compounds, and mixtures thereof, can be mentioned.

Preferably, the insulation layer does not comprise a carbon black. Also preferably, the insulation layer does not comprise flame retarding additive(s), e.g. a metal hydroxide containing additives in flame retarding amounts.

The preferred cable of the invention also contains inner and outer semiconductive layers. These can be made of any conventional material suitable for use in these layers. The inner and the outer semiconductive compositions can be different or identical and may comprise a polymer(s) which is preferably a polyolefin or a mixture of polyolefins and a conductive filler, preferably carbon black. Suitable polyolefin(s) are e.g. polyethylene produced in a low pressure process (LLDPE, MDPE, HDPE) or a polyethylene produced in a HP process (LDPE). The carbon black can be any conventional carbon black used in the semiconductive layers of a cable, preferably in the semiconductive layer of a power cable.

In a preferable embodiment, the outer semiconductive layer is cross-linked or not crosslinked. In another preferred embodiment, the inner semiconductive layer is cross-linked or non-cross-linked.

The conductor comprises one or more wires. Moreover, the cable may comprise one or more such conductors. Preferably the conductor is an electrical conductor and comprises one or more metal wires. Cu or Al wire is preferred.

As well known the cable can optionally comprise further layers, e.g. screen(s), a jacketing layer(s), other protective layer(s) or any combinations thereof.

Cable Manufacture

The invention also provides a process for producing a cable comprising the steps of applying on one or more conductors, preferably by (co) extrusion, a layer comprising the polymer composition as hereinbefore described.

The invention also provides a process for producing a cable comprising the steps of applying on one or more conductors, preferably by (co) extrusion, an inner semiconductive layer, an insulation layer and an outer semiconductive layer, in that order, wherein the insulation layer comprises the composition of the invention as hereinbefore described.

The process may optionally comprise the step of crosslinking the insulation layer. The process may also optionally comprise the steps of crosslinking one or both of the inner semiconductive layer or outer semiconductive layer.

More preferably, a cable is produced, wherein the process comprises the steps of (a) providing and mixing an optionally crosslinkable first semiconductive composition comprising a polymer, a carbon black and optionally further component(s) for the inner semiconductive layer, providing and mixing the polymer composition of the invention; and providing and mixing a second semiconductive composition which is optionally crosslinkable and comprises a polymer, a carbon black and optionally further component(s) for the outer semiconductive layer, (b) applying on one or more conductors, preferably by coextrusion, a melt mix of the first semiconductive composition obtained from step (a) to form the inner semiconductive layer, a meltmix of polymer composition of the invention obtained from step (a) to form the insulation layer, and a meltmix of the second semiconductive composition obtained from step (a) to form the outer semiconductive layer, and (c) optionally crosslinking at crosslinking conditions the insulation layer and/or one or both of the first semiconductive composition of the inner semiconductive layer and the second semiconductive composition of the outer semiconductive layer, of the obtained cable.

Melt mixing means mixing above the melting point of at least the major polymer component(s) of the obtained mixture and is carried out for example, without limiting to, in a temperature of at least 15° C. above the melting or softening point of polymer component(s).

The thickness of the insulation layer of the cable, more preferably of the power cable, is typically 2 mm or more, preferably at least 3 mm, preferably of at least 3 to 100 mm, more preferably from 3 to 50 mm, and conventionally 3 to 40 mm, e.g. 3 to 35 mm, when measured from a cross section of the insulation layer of the cable.

The thickness of the inner and outer semiconductive layers is typically less than that of the insulation layer, and can be e.g. more than 0.1 mm, such as from 0.3 up to 20 mm, 0.3 to 10 of inner semiconductive and outer semiconductive layer. The thickness of the inner semiconductive layer is preferably 0.3-5.0 mm, preferably 0.4-3.0 mm, preferably 0.5-2.0 mm. The thickness of the outer semiconductive layer is preferably from 0.3 to 10 mm, such as 0.3 to 5 mm, preferably 0.4 to 3.0 mm, preferably 0.5-2.0 mm. It is evident for and within the skills of a skilled person that the thickness of the layers in a power cable depends on the intended voltage level of the end application cable and can be chosen accordingly.

The preferable embodiments of the invention can be combined with each other in any way to further define the invention.

The invention will now be explained with reference to the following non limiting examples and Figures.

FIG. 1: dielectric properties of IE1-IE4 and CE1-CE2

Figure 2:
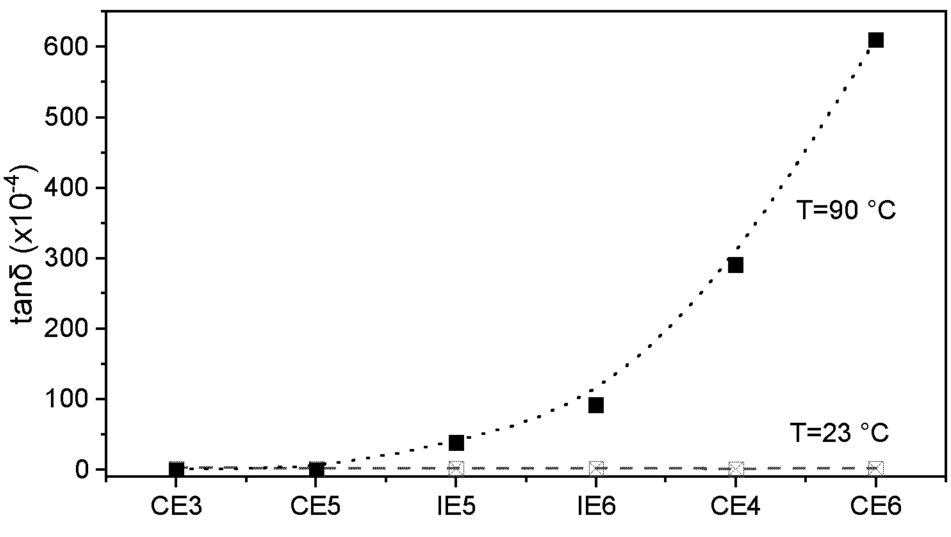

FIG. 2: dielectric properties of IE5-IE6 and CE3-CE6

Figure 3:
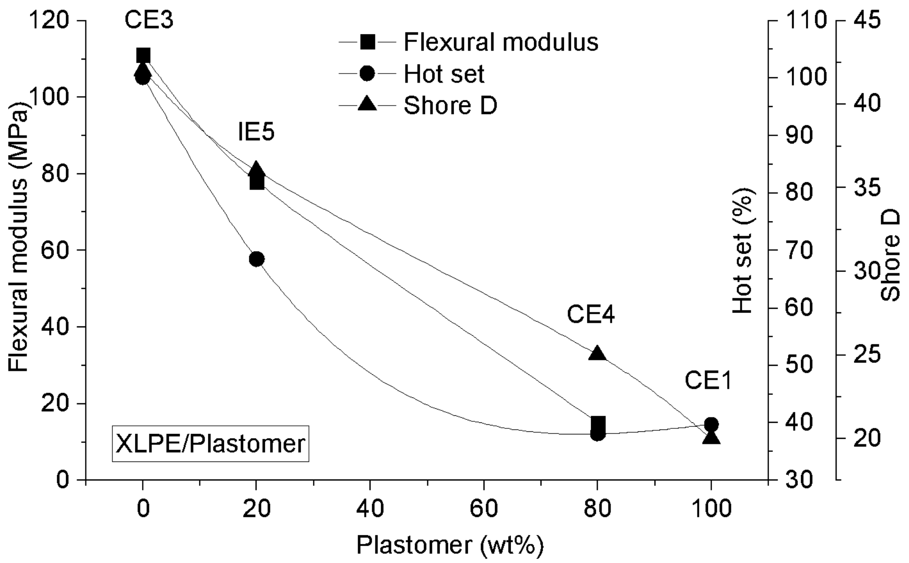

FIG. 3: mechanical properties of IE5, CE3 & CE4

Figure 4:
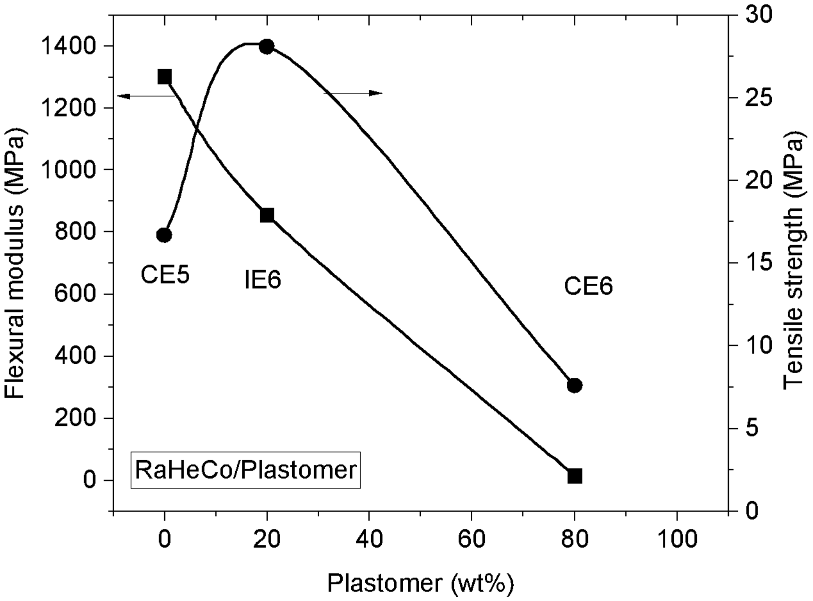

FIG. 4: mechanical properties of IE6, CE5 & CE6

MEASUREMENT METHODS

Determination Methods

Unless otherwise stated in the description or experimental part the following methods were used for the property determinations.

Wt %: % by weight

Melt Flow Rate

The melt flow rate (MFR) was determined according to ISO 1133 and is indicated in g/10 min. The MFR is an indication of the flowability, and hence the processability, of the polymer. The higher the melt flow rate, the lower the viscosity of the polymer. The MFR was determined at 190° C. for polyethylene and at 230° C. for polypropylene. MFR may be determined at different loadings such as 2.16 kg ($MFR_2$) or 21.6 kg ($MFR_{21}$).

Molecular Weight

Mz, Mw, Mn, and MWD were measured by Gel Permeation Chromatography (GPC) according to the following method:

The weight average molecular weight Mw and the molecular weight distribution (MWD=Mw/Mn wherein Mn is the number average molecular weight and Mw is the weight average molecular weight; Mz is the z-average molecular weight) was measured according to ISO 16014-4:2003 and ASTM D 6474-99. A Waters GPCV2000 instrument, equipped with refractive index detector and online viscosimeter was used with 2×GMHXL-HT and 1× G7000HXL-HT TSK-gel columns from Tosoh Bioscience and 1,2,4-trichlorobenzene (TCB, stabilized with 250 mg/L 2,6-Di tert-butyl-4-methyl-phenol) as solvent at 140° C. and at a constant flow rate of 1 mL/min. 209.5 μL of sample solution were injected per analysis. The column set was calibrated using universal calibration (according to ISO 16014-2:2003) with at least 15 narrow MWD polystyrene (PS) standards in the range of 1 kg/mol to 12 000 kg/mol. Mark Houwink constants were used as given in ASTM D 6474-99. All samples were prepared by dissolving 0.5-4.0 mg of polymer in 4 mL (at 140° C.) of stabilized TCB (same as mobile phase) and keeping for max. 3 hours at a maximum temperature of 160° C. with continuous gentle shaking prior sampling in into the GPC instrument.

Comonomer Contents a) Comonomer Content in Random Copolymer of Polypropylene:

Quantitative Fourier transform infrared (FTIR) spectroscopy was used to quantify the amount of comonomer. Calibration was achieved by correlation to comonomer contents determined by quantitative nuclear magnetic resonance (NMR) spectroscopy. The calibration procedure based on results obtained from quantitative 13C-NMR spectroscopy was undertaken in the conventional manner well documented in the literature.

The amount of comonomer (N) was determined as weight percent (wt %) via:

$$N = k1(A/R) + k2$$

wherein A is the maximum absorbance defined of the comonomer band, R the maximum absorbance defined as peak height of the reference peak and with k1 and k2 the linear constants obtained by calibration. The band used for ethylene content quantification is selected depending if the ethylene content is random (730 $cm^{-1}$)

or block-like (as in heterophasic PP copolymer) (720 $cm^{-1}$). The absorbance at 4324 $cm^{-1}$ was used as a reference band.

b) Quantification of Alpha-Olefin Content in Linear Low Density Polyethylenes and Low Density Polyethylenes by NMR Spectroscopy:

The comonomer content was determined by quantitative 13 C nuclear magnetic resonance (NMR) spectroscopy after basic assignment (J. Randall JMS—Rev. Macromol. Chem. Phys., C29(2&3), 201-317 (1989). Experimental parameters were adjusted to ensure measurement of quantitative spectra for this specific task.

Specifically solution-state NMR spectroscopy was employed using a Bruker AvanceIII 400 spectrometer. Homogeneous samples were prepared by dissolving approximately 0.200 g of polymer in 2.5 ml of deuterated-tetrachloroethene in 10 mm sample tubes utilising a heat block and rotating tube oven at 140 C. Proton decoupled 13 C single pulse NMR spectra with NOE (powergated) were recorded using the following acquisition parameters: a flip-angle of 90 degrees, 4 dummy scans, 4096 transients an acquisition time of 1.6 s, a spectral width of 20 kHz, a temperature of 125 C, a bilevel WALTZ proton decoupling scheme and a relaxation delay of 3.0 s. The resulting FID was processed using the following processing parameters: zero-filling to 32 k data points and apodisation using a gaussian window function; automatic zeroth and first order phase correction and automatic baseline correction using a fifth order polynomial restricted to the region of interest.

Quantities were calculated using simple corrected ratios of the signal integrals of representative sites based upon methods well known in the art.

c) Comonomer Content of Polar Comonomers in Low Density Polyethylene (1) Polymers Containing >6 wt % Polar Comonomer Units Comonomer content (wt %) was determined in a known manner based on Fourier transform infrared spectroscopy (FTIR) determination calibrated with quantitative nuclear magnetic resonance (NMR) spectroscopy. Below is exemplified the determination of the polar comonomer content of ethylene ethyl acrylate, ethylene butyl acrylate and ethylene methyl acrylate. Film samples of the polymers were prepared for the FTIR measurement: 0.5-0.7 mm thickness was used for ethylene butyl acrylate and ethylene ethyl acrylate and 0.10 mm film thickness for ethylene methyl acrylate in amount of >6 wt %. Films were pressed using a Specac film press at 150° C., approximately at 5 tons, 1-2 minutes, and then cooled with cold water in a not controlled manner. The accurate thickness of the obtained film samples was measured.

After the analysis with FTIR, base lines in absorbance mode were drawn for the peaks to be analysed. The absorbance peak for the comonomer was normalised with the absorbance peak of polyethylene (e.g. the peak height for butyl acrylate or ethyl acrylate at 3450 $cm^{-1}$ was divided with the peak height of polyethylene at 2020 $cm^{-1}$). The NMR spectroscopy calibration procedure was undertaken in the conventional manner which is well documented in the literature, explained below.

For the determination of the content of methyl acrylate a 0.10 mm thick film sample was prepared. After the analysis the maximum absorbance for the peak for the methylacrylate at 3455 $cm^{-1}$ was subtracted with the absorbance value for the base line at 2475 $cm^{-1}$ ($A_{methylacrylate}-A_{2475}$). Then the maximum absorbance peak for the polyethylene peak at 2660 $cm^{-1}$ was subtracted with the absorbance value for the base line at 2475 $cm^{-1}$ ($A_{2660}-A_{2475}$). The ratio between ($A_{methylacrylate}-A_{2475}$) and ($A_{2660}-A_{2475}$) was then calculated in the conventional manner which is well documented in the literature.

The weight % can be converted to mol % by calculation. It is well documented in the literature.

Quantification of Copolymer Content in Polymers by NMR Spectroscopy

The comonomer content was determined by quantitative nuclear magnetic resonance (NMR) spectroscopy after basic assignment (e.g. "NMR Spectra of Polymers and Polymer Additives", A. J. Brandolini and D. D. Hills, 2000, Marcel Dekker, Inc. New York). Experimental parameters were adjusted to ensure measurement of quantitative spectra for this specific task (e.g "200 and More NMR Experiments: A Practical Course", S. Berger and S. Braun, 2004, Wiley-VCH, Weinheim). Quantities were calculated using simple corrected ratios of the signal integrals of representative sites in a manner known in the art.

(2) Polymers Containing 6 wt % or Less Polar Comonomer Units

Comonomer content (wt. %) was determined in a known manner based on Fourier transform infrared spectroscopy (FTIR) determination calibrated with quantitative nuclear magnetic resonance (NMR) spectroscopy. Below is exemplified the determination of the polar comonomer content of ethylene butyl acrylate and ethylene methyl acrylate. For the FT-IR measurement a film samples of 0.05 to 0.12 mm thickness were prepared as described above under method 1). The accurate thickness of the obtained film samples was measured.

After the analysis with FT-IR base lines in absorbance mode were drawn for the peaks to be analysed. The maximum absorbance for the peak for the comonomer (e.g. for methylacrylate at 1164 $cm^{-1}$ and butylacrylate at 1165 $cm^{-1}$) was subtracted with the absorbance value for the base line at 1850 $cm^{-1}$ ($A_{polar\ comonomer}-A_{1850}$). Then the maximum absorbance peak for polyethylene peak at 2660 $cm^{-1}$ was subtracted with the absorbance value for the base line at 1850 $cm^{-1}$ ($A_{2660}-A_{1850}$). The ratio between ($A_{comonomer}-A_{1850}$) and ($A_{2660}-A_{1850}$) was then calculated. The NMR spectroscopy calibration procedure was undertaken in the conventional manner which is well documented in the literature, as described above under method 1).

The weight-% can be converted to mol-% by calculation. It is well documented in the literature.

Below is exemplified how polar comonomer content obtained from the above method (1) or (2), depending on the amount thereof, can be converted to micromol or mmol per g polar comonomer as used in the definitions in the text and claims:

The millimoles (mmol) and the micro mole calculations have been done as described below.

For example, if 1 g of the poly(ethylene-co-butylacrylate) polymer, which contains 20 wt % butylacrylate, then this material contains $0.20/M_{butylacrylate}$ (128 g/mol)=$1.56\times10^{-3}$ mol. (=1563 micromoles).

The content of polar comonomer units in the polar copolymer $C_{polar\ comonomer}$ is expressed in mmol/g (copolymer). For example, a polar poly(ethylene-co-butylacrylate) polymer which contains 20 wt. % butyl acrylate comonomer units has a $C_{polar\ comonomer}$ of 1.56 mmol/g.

The used molecular weights are: $M_{butylacrylate}$=128 g/mole, $M_{ethylacrylate}$=100 g/mole, $M_{methylacrylate}$=86 g/mole).

Density

Low density polyethylene (LDPE): The density was measured according to ISO 1183-2. The sample preparation was executed according to ISO 1872-2 Table 3 Q (compression moulding).

Density of the PP polymer was measured according to ISO 1183/1872-2B.

Surface Area (BET)

The BET method uses a measurement of the physisorption of a gas to derive a value of "surface area" for a sample. The gas molecules can pass between particles and into all pores, cracks, and surface roughness, so that the measurement probes the full microscopic surface area of the sample. Most often, the sample in the form of powder or granules, and the result is stated as a Specific Surface Area, in units of area per unit mass. It may also be given as area per unit of volume, or as the absolute area for an object.

Dielectric Losses

Relative permittivity and dissipation factor on plaques at 50 Hz according to ASTM D150-11. 1.0 mm thick, round plaques were compression moulded and for the compositions containing peroxide, the samples were crosslinked during compression moulding whereas the composition free of peroxide were not crosslinked. Samples were mounted in a Tettex bridge at an electrode pressure of 6 N/cm$^2$. The dissipation factor was then measured at 500 V at 23 and 90° C., respectively.

Flex Modulus

The flexural modulus was measured according to ISO 178:2019. Test objects of 80×15 mm was prepared from a 4 mm plaque. Samples were mounted in Alwetron tensile testing machine, where the flexural modulus was measured in a 3-point bend test at 2 mm/min until a maximum of 5% deflection. The flexural modulus was measured in the interval of 0.05-0.25% deflection.

Hot Set

Degree of crosslinking was measured according to EN 60811-507:2012 on punched out dumbbells from compression moulded, crosslinked plaques. Load was 20 N/cm$^2$ and elongation was measured after 15 min in 200° C.

Shore D

Hardness of the material, Shore D, was measured according to ISO 868 and ISO 7619-1. 6 mm plaques were compression moulded, followed by Shore D measurements after 1, 3 and 15 seconds.

Tensile Strength & Elongation at Break

Tensile strength and elongation at break were determined according to ISO 527-2 (cross head speed=50 mm/min; 23° C.), Samples (5A according to ISO527) were punched out from compression moulded plaques, prepared from tapes that were placed in a 2.0 mm frame followed by melting at 120° C. and crosslinking at 180° C.

Particle Size

The particle size can be measured by laser diffraction (ISO13320), dynamic light scattering (ISO22412) or sieve analysis (ASTMD1921-06). Any limitation of the claims shall refer to values obtained from laser diffraction (ISO13320).

Tamped Density

The term "tamped density" refers to the weight of a filler specimen divided by its packed volume. The tamped density is determined by placing a filler specimen into a 10 ml graduated cylinder and recording the weight of the specimen. The graduated cylinder is then forcefully tapped up and down 300 times on a solid surface until a constant volume is attained, i.e. the volume of the filler in the cylinder cannot be reduced further by continued tapping. The weight of the filler is divided by its final, constant volume to yield the tamped density.

Examples

The following materials are used in the examples:

- Plastomer Queo 7007LA: unimodal ethylene octene copolymer from Borealis, with density 870 kg/m$^3$ and FR (2.16 kg/190° C.)=7 g/10 min
- LDPE: crosslinkable natural LDPE with density 921 kg/m$^2$ and MFR (2.16 kg/190° C.)=1.8 g/10 min produced according to IE4 of EP2450910A1.
- RaHeCo: random copolymer with low ethylene content and narrow molecular weight distribution MFR (2.16 kg/230° C.)=8 g/10 min. RaHeCo was produced according to the process conditions shown in below Table 1 with the catalyst and according to the process description as disclosed for IE2 according to EP2965908B1.

TABLE 1

| RaHeCo Process conditions | | |
|---|---|---|
| **Prepoly** | | |
| Co/ED | mol/mol | 5 |
| Co/Ti | mol/mol | 90 |
| Temperature | ° C. | 30 |
| Residence time | min | 0.3 |
| **Loop** | | |
| Temperature | ° C. | 70 |
| Pressure | kPa | 5400 |
| Split | wt % | 45 |
| H2/C3 | mol/kmol | 0.8 |
| C2/C3 | mol/kmol | 4.8 |
| MFR | g/10 min | 2.1 |
| C2 | wt % | 2.1 |
| XCS | wt % | 5.0 |
| **GPR1** | | |
| Temperature | ° C. | 80 |
| Pressure | kPa | 2200 |
| Split | wt % | 55 |
| H2/C3 | mol/kmol | 5.3 |
| C2/C3 | mol/kmol | 10.2 |
| MFR(GPR1) | g/10 min | 1.6 |
| C2(GRP1) | wt % | 2.1 |
| XCS(GPR1) | wt % | 5.0 |
| **Mixer** | | |
| C2 | wt % | 2.1 |
| MFR | g/10 min | 1.8 |
| Pellet | | |
| MFR | g/10 min | 8 |
| XCS | wt % | 5.0 |
| Tm | ° C. | 150 |
| Tc | ° C. | 106 |

- Filler 1: AEROSIL R-805 from Evonik
- Filler 2: AEROSIL R-182 from Evonik
- Filler 3: AEROXIDE Alu C-805 from Evonik
- Filler 4: Melamine from Borealis Agrolinz Melamin Gmbh
- Filler 5: Talc Sample Preparation:

Polymer compositions were prepared as shown in Table 2, with amounts of each component shown in wt %. The blends were compounded on a twin screw extruder (TSE 24TC). For the blends with fillers, ground plastomer was added in the comparative example to account for any negative effects by adding powder as such during compounding. Compounding temperature was set to 120° C. For the LDPE/plastomer blends mixing temperature was 130° C. and for the RaHeCo/plastomer blend the mixing temperature was set to 230° C.

LDPE/filler blends, plastomers/filler blends, and LDPE/plastomer blends were soaked with 1.0 wt. % tert-butyl cumyl peroxide based on the total weight of the blend at ambient conditions, followed by melting and crosslinking at 120° C. and 180° C., respectively during compression moulding. Mechanical and electrical testing was performed on plaques.

TABLE 2

| Compositions prepared (amounts given in wt %) | | | | | | | | | | | | |
|---|---|---|---|---|---|---|---|---|---|---|---|---|
| | IE1* | IE2* | IE3* | IE4* | CE1* | CE2* | IE5* | IE6 | CE3* | CE4* | CE5 | CE6 |
| Plastomer | 97.5 | 97.5 | 97.5 | 97.5 | 100 | 99.7 | 20 | 20 | | 80 | | 80 |
| LDPE | | | | | | | 80 | | 100 | 20 | | |
| RaHeCo | | | | | | | | 80 | | | 100 | 20 |
| Filler 1 | 2.5 | | | | | | | | | | | |
| Filler 2 | | 2.5 | | | | | | | | | | |
| Filler 3 | | | 2.5 | | | | | | | | | |
| Filler 4 | | | | 2.5 | | | | | | | | |
| Filler 5 | | | | | | 0.3 | | | | | | |

*cross-linked with 1.0 wt.-% tert-butyl cumyl peroxide.

Results are presented in FIGS. 1 to 4, which shows the dielectric and mechanical properties for the different blends.

FIGS. 1 and 2 demonstrate the low dielectric losses possessed by the inventive compositions. FIG. 1: At room temperature, the behaviour was quite similar for all compositions, however at the temperature of interest 90° C. the picture changes. While the dielectric losses for CE2 does not change compared to pure CE1, all other samples IE1-IE4 show a strong reduction in the dielectric losses. FIG. 2: LDPE with 20 wt % plastomer (IE5) only shows a moderate increase in tan δ compared to pure LDPE (CE3), while the dielectric losses of RaHeCo+20% plastomer (IE6) are close to linear to the plastomer content. This phenomenon is also observed for LDPE+80% plastomer (CE4) and RaHeCo+80% plastomer (CE6). The dielectric losses are only around 50% of the losses for pure plastomer in the LDPE+20% plastomer blend (IE5). For RaHeCo, the dielectric losses at 80% plastomer content (CE6) is basically at the same level as for pure plastomer (CE1).

FIGS. 3 and 4 display mechanical properties, illustrating the good balance possesses by the inventive compositions. The flexibility increases almost linearly with the amount of plastomer added in both RaHeCo and LDPE, leading overall to a softer and more flexible cable.

The invention claimed is:

1. A cable comprising one or more conductors surrounded by at least one layer, wherein said layer comprises a polymer composition comprising:

90 to 99.8 wt % of an ethylene based plastomer; and 0.2 to 10 wt % of an amine filler, an oxide filler, or mixtures thereof;

and wherein said polymer composition has a dielectric loss expressed as tan δ (50 Hz) of $200\times10^{-4}$ or less, when measured at 500 V/mm and 90° C. as described in the description part under "Determination methods".

2. The cable as claimed in claim 1, wherein said ethylene based plastomer is an ethylene copolymer with one or more alpha-olefin comonomers.

3. The cable as claimed in claim 1, wherein said amine filler, oxide filler or mixture thereof is present in an amount of 0.5 to 8.0 wt %, relative to the weight of the polymer composition as a whole.

4. The cable as claimed in claim 1, wherein said amine filler is a derivative of cyanamide.

5. The cable as claimed in claim 1, wherein said oxide filler is a metal or metalloid oxide.

6. The cable as claimed in claim 1, wherein said oxide filler has:

a specific surface area (BET) of 50 to 600 $m^2/g$, when measured as described in the description part under "Determination methods";

an average particle size of 5 to 50 nm, when measured as described in the description part under "Determination methods";

a tamped density of 25 to 100 g/l, when measured as described in the description part under "Determination methods";

or a combination thereof.

7. The cable as claimed in claim 1, wherein said polymer composition is crosslinked in the presence of a crosslinking agent.

8. A process for producing the cable as claimed in claim 1, the process comprising the steps of: applying on one or more conductors, the layer comprising the polymer composition.

9. A cable comprising one or more conductors surrounded by at least one layer wherein said layer comprises a polymer composition comprising:

(i) 10 to 40 wt % of an ethylene based plastomer; and (ii) 60 to 90 wt % of a polyolefin (a) selected from the group consisting of an LDPE, polypropylene homopolymer, random heterophasic polypropylene copolymer and mixtures thereof;

and wherein said polymer composition has a dielectric loss expressed as tan δ (50 Hz) of $200\times10^{-4}$ or less, when measured at 500 V/mm and 90° C. as described in the description part under "Determination methods".

10. The cable of claim 9, wherein the polymer composition further comprises:

(iii) 0.2 to 10 wt % of an amine filler, oxide filler, or mixtures thereof;

and wherein said polymer composition has a dielectric loss expressed as tan δ (50 Hz) of $50\times10^{-4}$ or less, when measured at 500 V/mm and 90° C. as described in the description part under "Determination methods".

11. The cable as claimed in claim 10, wherein said amine filler, oxide filler or mixture thereof is present in an amount of 0.5 to 8.0 wt %, relative to the weight of the polymer composition as a whole.

12. The cable as claimed in claim 10, wherein said amine filler is a derivative of cyanamide.

13. The cable as claimed in claim 10, wherein said oxide filler is a metal or metalloid oxide.

14. The cable as claimed in claim 10, wherein said oxide filler has:

a specific surface area (BET) of 50 to 600 $m^2/g$, when measured as described in the description part under "Determination methods";

an average particle size of 5 to 50 nm, when measured as described in the description part under "Determination methods";

a tamped density of 25 to 100 g/l, when measured as described in the description part under "Determination methods";

or a combination thereof.

15. The cable as claimed in claim 9, wherein the LDPE is an LDPE homopolymer or copolymer.

16. The cable as claimed in claim 9, wherein the polypropylene homopolymer is an isotactic polypropylene homopolymer.

17. The cable as claimed in claim 9, wherein the random heterophasic polypropylene copolymer comprises 50 to 90 wt % of a propylene copolymer rubber component and 10 to 50 wt % of a propylene homopolymer or copolymer matrix component.

18. The cable as claimed in claim 9, wherein said ethylene based plastomer is an ethylene copolymer with one or more alpha-olefin comonomers.

19. The cable as claimed in claim 9, wherein said polymer composition is crosslinked in the presence of a crosslinking agent.

20. A process for producing the cable as claimed in claim 9, the process comprising the steps of: applying on one or more conductors, the layer comprising the polymer composition.

* * * * *